United States Patent [19]

Weinberg

[11] Patent Number: 4,575,735

[45] Date of Patent: Mar. 11, 1986

[54] DROPLET DEPOSITING VISCOSITY LINE-PRESSURE SENSING CONTROL FOR FLUID RE-SUPPLY

[75] Inventor: Hillar Weinberg, Girton, England

[73] Assignee: Willett International Limited, Slough, England

[21] Appl. No.: 601,842

[22] Filed: Apr. 19, 1984

[30] Foreign Application Priority Data

Feb. 4, 1983 [GB] United Kingdom ................. 8310711

[51] Int. Cl.[4] ....................... G01D 15/18; B65D 83/14

[52] U.S. Cl. ....................................... 346/1.1; 346/75; 222/394; 222/420

[58] Field of Search ............. 346/75, 140 R; 222/394, 222/420

[56] References Cited

U.S. PATENT DOCUMENTS 3,661,304 5/1972 Martinez et al. .................... 222/394
3,787,882 1/1974 Fillmore et al. ...................... 346/75
4,270,133 5/1981 Shimazawa et al. ........... 346/140 R
4,337,468 1/1982 Mizuno ................................ 346/1.1
4,460,904 7/1984 Oszczaniewicz et al. ............ 346/75

*Primary Examiner*—E. A. Goldberg
*Assistant Examiner*—Gerald E. Preston
*Attorney, Agent, or Firm*—Wenderoth, Lind & Ponack

[57] ABSTRACT

A fluid including a liquid solvent or carrier medium is applied to a substrate using an ink jet printing device in which the fluid composition is ejected through a nozzle as a jet of fluid, the jet is broken up into substantially uniformly sized droplets by the application of vibration to the composition, the droplets are passed by an electrode by which they are given an electrical charge, the charged droplets are passed through an electric field whereby they are deflected to a desired extent so as selectively to fall upon a substrate to form a symbol thereon or into a catch from which the composition is recycled for re-use. The viscosity of the fluid composition is monitored, and solvent or carrier liquid is added to the fluid to return the liquid content of the fluid to a desired value.

6 Claims, 1 Drawing Figure

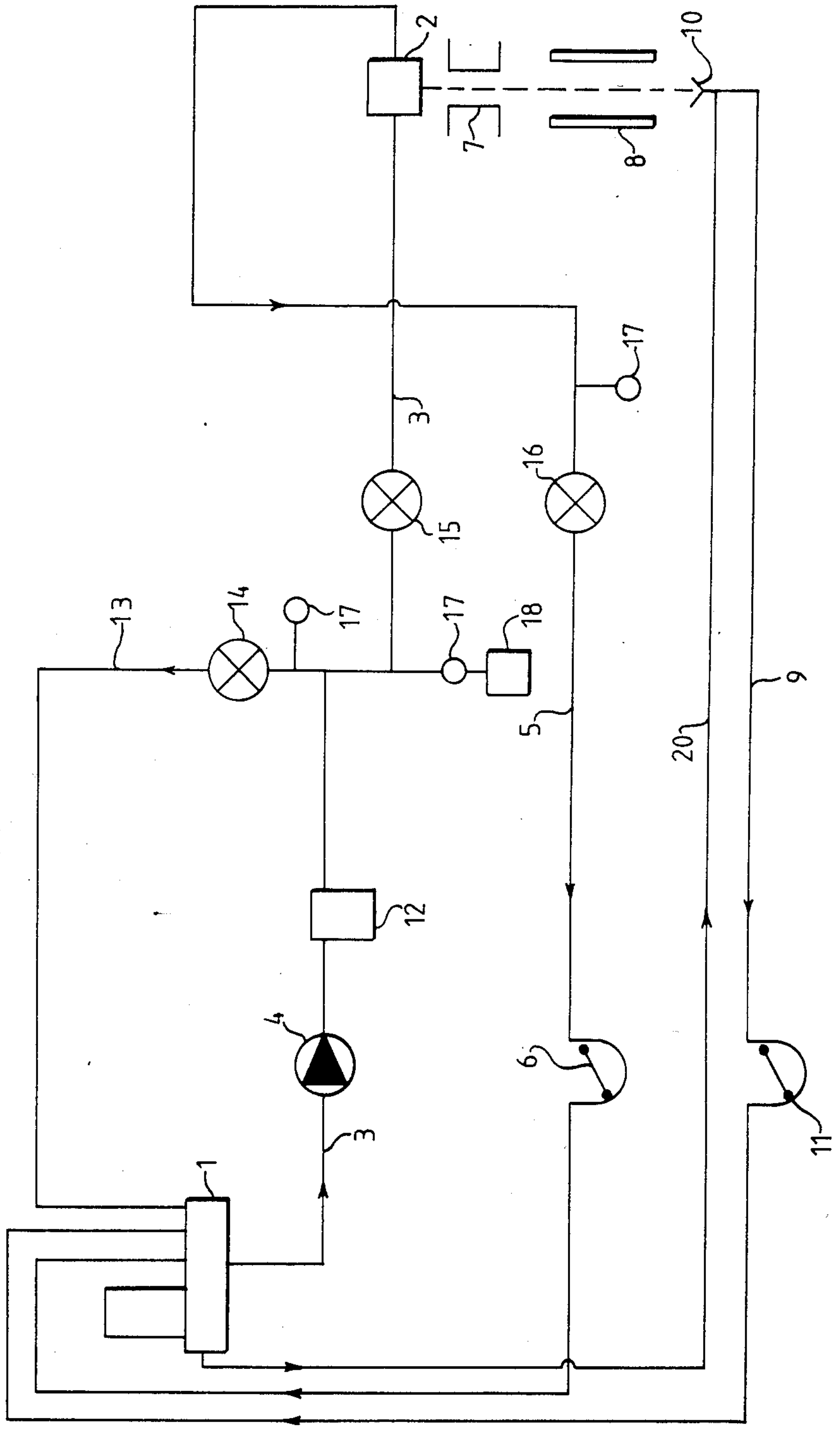
1
2
3
4
5
6
7
8
9
10
11
12
13
14
15
16
17
18
20

DROPLET DEPOSITING VISCOSITY LINE-PRESSURE SENSING CONTROL FOR FLUID RE-SUPPLY

BACKGROUND OF THE INVENTION

The present invention relates to a droplet depositing apparatus and to a method for depositing droplets, notably to a modified ink jet printing apparatus and ink jet printing method.

In a typical continuous jet ink jet printing apparatus, an ink composition is ejected through a nozzle to form a jet of ink which is broken up into substantially uniformly sized droplets by applying a suitable frequency vibration to the ink. The vibration is typically generated by causing a piezo-electric crystal to vibrate by applying a voltage thereto. The droplets are charged by passing them past a charge electrode which imparts a desired charge to each droplet. The charged droplets are deflected by passing them through an electric field, usually generated by a pair of electrically charged deflector plates. The deflection causes the droplets to follow a flight path which either carries the droplets into a catching arrangement so that they do not strike the substrate to be printed and/or causes the droplets to be displaced to a desired extent to form a symbol on the substrate which can be moving relative to the droplets or stationary with the droplets being deflected relative to the substrate.

Such an apparatus is denoted herein as "a droplet depositing apparatus of the kind described".

The extent of deflection is controlled by varying the charge given to each droplet and/or by varying the strength of the deflecting field. However, whichever method is used to control the deflection of the droplet, it is necessary to ensure that each droplet has an essentially consistent mass and composition. If either of these factors varies, the charge per unit mass induced in the droplets will vary. This will affect the deflection and hence the flight path of the droplets and this in turn will affect the deposition pattern of the droplets on the substrate.

During operation of the printer, ink which is caught and not allowed to strike the substrate is recycled through the printing system. With time, the ink loses solvent and other volatile components and its specific gravity and composition change. In order to reduce the effects of these losses from the composition, it has been proposed to monitor the weight of the ink held in the printing system. From a knowledge of the starting weight of ink in the system and the number of characters printed, it is possible to determine the weight of ink which should remain in the system at any given time. The shortfall in the actual amount present represents approximately the weight of solvent lost from the system. The requisite amount of solvent can then be added to the ink reservoir to make good the losses and thus return the ink to the intial composition. Alternatively, the operator merely assesses the number of characters printed and based on an estimate of the solvent losses adds an aliquot of solvent to the ink reservoir at intervals during the operation of the printer.

However, such methods of operation are haphazard and often require that the system be shut down and all the ink drained into the weighing vessel. This is inconvenient and interrupts printing operations. Furthermore, in practice such a system can only be carried out at lengthy intervals in the printing operation, with the result that the compositon of the ink can vary by comparatively large amounts before the need to rectify the position can be verified.

SUMMARY OF THE INVENTION

We have now surprisingly found that the viscosity of an ink formulation gives a sufficiently accurate reflection of the loss of solvent from the ink for the viscosity to be used to indicate solvent losses. Measurement of the viscosity provides a simple and effective means for detecting and evaluating the loss of solvent from an ink. The amount of solvent required to maintain the ink composition within the desired composition limits may be readily determined from calibration tests. Moreover, viscosity can be simply determined during operation of the printing process, thus reducing interruption of the printing process, using simple techniques.

Accordingly, the present invention provides a process for applying in droplet form a fluid comprising a liquid solvent or carrier medium to a substrate using a droplet depositing apparatus of the kind described, characterised in that the viscosity of the fluid is monitored and in that solvent or carrier liquid is added to the fluid to return the liquid content of the fluid to a desired value.

The invention also provides a droplet deposition apparatus of the kind described, characterised in that it incorporates a means for monitoring the viscosity of the fluid used in the apparatus to provide one or more measurements indicative of the viscosity of the fluid in the apparatus; and means for incorporating one or more components of the fluid into the fluid in response to the said measurements. Preferably, the apparatus incorporates a circulating system for the fluid and the viscosity of the fluid is measured in that system, notably by means of a pressure drop in the system.

While it has been known that the fluid to be applied using droplet deposition apparatus of the kind described has to have certain viscosity characteristics to enable it to be applied through given nozzles at a given pressure using a given apparatus to achieve a given droplet size and velocity, the viscosity has only been used to identify the initial physical properties of the fluid, not its composition. There has been no suggestion that the viscosity should be measured during operation of the printing apparatus nor that the viscosity could be used to monitor the loss of solvent or carrier liquids from the composition.

The invention can be used in the application of a wide range of fluids which are to be deposited on a substrate, eg. adhesives, bonding agents, catalysts, a wetting agent or other fluid compositions in solution, dispersion, emulsion or latex form. However, the invention is of especial use in the application of ink formulations and, for convenience, the invention will hereinafter be described with respect to that preferred use.

The invention can be applied to water or solvent based formulations, but is of greatest use where the formulation contains solvents or other components which evaporate readily from the composition, eg. have a boiling point under the conditions at which the apparatus is operated of 100° C. or less. Typically, such volatile components will include alkanols, ketones, ethers and other organic solvents, but may also include water and other fluid components of the ink.

The apparatus for present use can be selected from a wide range of such apparatus of the kind described and within reason the exact nature of the apparatus will not affect the successful operation of the invention.

In the method of the invention, the viscosity of the composition is measured to detect any significant changes about the desired value and one or more components are then added to return the viscosity to a desired value. There may be cases where the viscosity of the ink is required to be different from the initial value, eg. where the velocity of the droplet is to be increased or reduced to reflect a change in the conditions under which the printer is being operated. Furthermore, the components required to maintain the fluid at the desired viscosity level can be added at any convenient time during the printing operation and need not be added in response to each viscosity measurement. Thus, the components can be added in small amounts at frequent intervals to maintain the viscosity within closely defined limits; or can be added at larger intervals of several hours where the acceptable viscosity limits are comparatively wide.

The viscosity of the ink or other fluid can be readily determined using conventional techniques. Thus, a spinning disc or similar viscometer can be mounted within the reservoir from which ink is drawn for feeding to the printing head and to which ink is recycled from the catching arrangement or other circulating systems in the apparatus. However, it is particularly preferred to measure the viscosity by means of the pressure drop within a given section of the apparatus or across a venturi device located in a fluid circulation system of the apparatus. Such a means provides a simple viscosity measurement which can be used during operation of the printing apparatus. Since the viscosity of the fluid is substantially proportional to the pressure drop observed, it is possible to determine a calibration of the viscosity in the particular apparatus for a given ink type of composition and at a number of operating temperatures. This calibration can then be used, eg. as a set of tables or via a suitable computer, to determine the amount of solvent or other material which has to be added to return the fluid to a given viscosity level at a given operating temperature.

In a particularly preferred form of the apparatus, ink is fed by means of a pump from a reservoir or other vessel to the printing head and part of the output from the pump is circulated back to the reservoir or other vessel. It is preferred that the viscosity of the ink be measured in the recirculation loop from the pump to the reservoir. Alternatively, the viscosity can be measured in that ink which is recirculated from the catching arrangement to the reservoir or other vessel.

In either case, it is preferred to pass the fluid along a pipe or other duct of known diameter and to measure the pressure drop along a known length of that duct. This can be done using pressure sensors or transducers at the desired points along the duct. However, we prefer to provide a valve at one end of the duct with a single transducer or other pressure measurement means located between the valve and the pump. The valve is closed to provide a first pressure reading corresponding to the static head delivered by the pump. The valve is then opened and a second pressure reading taken. The difference between the two pressure readings gives an indication of the viscosity.

By adjusting the rate of operation of the pump, i.e., by employing a variable flow pump, so as to achieve substantially the same initial pressure reading, it is possible to obtain a table of calibration readings using different inks of known viscosity for that specific apparatus. The calibration readings will also compensate for any variation about the expected values for the length and diameter of the duct in which the pressure drop is measured. If substantially the same initial pressure is used in later pressure readings, the viscosity can be read off from the calibration table or can be derived therefrom by simple calculation.

It will be appreciated that the rate of operation of the pump should desirably be maintained substantially constant during the measurement operation. This is conveniently achieved by maintaining a substantially constant voltage driving the motor of the pump. The voltage can also be used to provide an alternative to measuring the pressure drop using transducers, since the voltage drop reflects the pressure drop and hence the viscosity.

A further alternative method for monitoring the viscosity of the fluid used in the apparatus is to measure the pressure drop across a venturi type device in a section of the fluid flow system of the apparatus. As with the methods described above, it is preferred to do this in a re-circulation section of the apparatus and to feed fluid through the venturi at a substantially constant velocity.

The viscosity of the fluid in the apparatus can be measured using the above methods without any significant interruption of the printing operation to provide readings of the viscosity at any desired intervals. The readings can be used to actuate a feed of solvent or other volatile component into the fluid flow system at any suitable point, eg. into the ink reservoir from which ink is drawn to feed the printing head. The feed of solvent can be by any suitable means, eg. a measured dose solenoid pump. However, as indicated above, the solvent need not be added at every occasion that the viscosity departs from the desired optimal value. Larger additions at less frequent intervals can be made where the tolerance on the viscosity permits this. Thus, for some operations it may be possible to add make-up solvent once a day.

The apparatus can be provided with other features which enhance its operation. Thus, we have found that it is desirable that the air stream drawn into the apparatus with the ink which is recycled from the droplet catching arrangement at the print head should be returned to the intake to the catching arrangement. In this way solvent and other vapours which are held in this air stream are retained within the apparatus and not discharged to the atmosphere where they represent a hazard as well as a loss of solvent.

BRIEF DESCRIPTION OF THE DRAWING

A particularly preferred form of the invention will now be described with reference to the accompanying drawing which is a diagrammatic line flow chart of the apparatus for use in the method of the invention.

DETAILED DESCRIPTION OF THE INVENTION

Ink is held in a reservoir 1 and fed to a printing head 2 comprising a series of nozzles via line 3 through which the ink flows under the pressure generated by a pump 4. Ink fed to head 2 can be recirculated from the print head 2 to the reservoir 1 via a bleed line 5 by means of a peristaltic pump 6. Alternatively, part of the output from pump 4 is recycled through a by-pass line 13 without the need for a separate pump 6.

Ink fed to head 2 issues as a series of substantially mono-sized droplets which pass a charge electrode 7 to give charged droplets. The charged droplets then pass between a pair of deflection plates 8 in order that the charged droplets can be deflected aside from the straight line path shown to achieve the desired laydown pattern on the substrate to which the ink is to be applied. Where a droplet is not to strike the substrate, ie. where no symbol is to be printed on the substrate, the droplet is not deflected and is caught in the catching gutter 10. It will be appreciated that the droplets can be given varying degrees of charge and pass through a constant deflection field or vice versa and that the gutter 10 can be static with the droplets being deflected from it to impinge upon the substrate or the gutter can be moved into the stream of droplets to catch them.

The droplets caught in the gutter 10 are recycled to the reservoir 1 for re-use by a peristaltic pump 11. The drawing of ink into the recycle line 9 also draws in air which increases the loss of solvent from the recycled ink, notably when the ink is discharged into the reservoir 1. It is therefore preferred that an air line 20 be provided to return solvent laden air from the reservoir 1 to the intake of recycle line 9.

The pressure drop which gives the viscosity monitor can be measured in the bleed line 5, the feed line 3 to the print head or in the by-pass line 13. In order to measure the pressure drop, each line is provided with a valve, eg. a solenoid valve, 16, 15 or 14 respectively and a pressure sensor, eg. a transducer or pressure gauge 17, upstream of the relevant valve.

In operation, ink is fed to the printing head and part is fed to line 3, 5 and/or 13. The valve in the relevant line is closed and an initial pressure reading taken with the pump 4 running and the valve closed. Preferably, the voltage applied to the pump motor is also read and this voltage is maintained substantially constant during the initial and pressure drop measurements. The valve is then opened and the second, lower pressure read as the ink flows through the length of line 3, 5 or 13. The value of the pressure drop can be displayed visually or, more preferably, is fed to the computer 18 controlling the operation of the printer to enable the computer to calculate the amount of solvent required to restore the ink to a given viscosity value at the relevant operating temperature. The computer can then display the amount of solvent to be added or can actuate some automatic dosing mechanism, not shown, to feed the required amount of ink to the reservoir 1.

As indicated above, the transducer 17 can be omitted and the viscosity monitored by observing the change in voltage on the motor of pump 4 when the valve 14, 15 or 16 is opened.

What I claim is:

1. In a method for applying an ink composition comprising a carrier medium to a substrate using a droplet depositing apparatus in which the ink is ejected through a nozzle as a jet of fluid, the jet is broken up into substantially uniformly sized droplets by the application of vibration to the ink, the droplets are given an electrical charge by means of a charge electrode, the charged droplets are passed through an electric field whereby they are deflected to a desired extent so as selectively to fall upon a substrate to form a symbol thereon and into a catching means from which the ink is recycled for re-use, and the viscosity of the recycled ink is monitored and carrier medium for the ink is added to the ink to return the liquid content of the ink composition to a desired valud, the improvement comprising:

pumping the ink composition by means of a variable flow pump through a circulation system of the apparatus containing a valve; and monitoring the viscosity of the ink by determining the difference in pressure within a section of said circulation system between when said valve is closed and when said valve is open, said difference in pressure being a function of the amount of said carrier medium to be added.

2. A method as claimed in claim 1, wherein the pressure is measured by means of a transducer located upstream of said valve to give a direct pressure change reading.

3. A method as claimed in claim 1, wherein said change in pressure is measured in terms of a voltage change on an electric motor driving said pump.

4. In a droplet deposition apparatus of the type including a fluid reservoir, a nozzle through which a fluid is ejected, said nozzle being in fluid flow communication with said reservoir, means for applying vibration to the fluid to thereby form the fluid ejected from said nozzle into substantially uniformly sized droplets, charging means for imparting an electrical charge to the droplets, deflection means for deflecting the charged droplets to a desired extent so as selectively to fall upon a substrate to form a symbol thereon or into a catching means whereby the droplets are caught for recycle to said reservoir, during which the composition of the fluid changes, the improvement comprising means for determining the extent of said change as a function of change of viscosity of said fluid, whereby make-up fluid may be added to compensate said composition change, said means comprising:

a duct within said apparatus;

variable flow pump means for pumping said fluid through said duct;

valve means in said duct for selectively closing and opening said duct; and means for determining the difference in pressure in said duct when said valve means is closed and when said valve means is opened to enable fluid flow through said duct, said pressure difference being a function of said viscosity change.

5. The improvement claimed in claim 4, wherein said means for determining said pressure difference comprises a pressure sensing means located intermediate said valve means and said pump means.

6. The improvement claimed in claim 4, wherein said means for determining said pressure difference comprises means for monitoring the voltage on an electric motor driving said pump means for circulating the fluid through said duct.

* * * * *